Jan. 17, 1933.  J. L. IVERSON  1,894,871
LAND LEVELER
Filed July 29, 1932  2 Sheets-Sheet 1
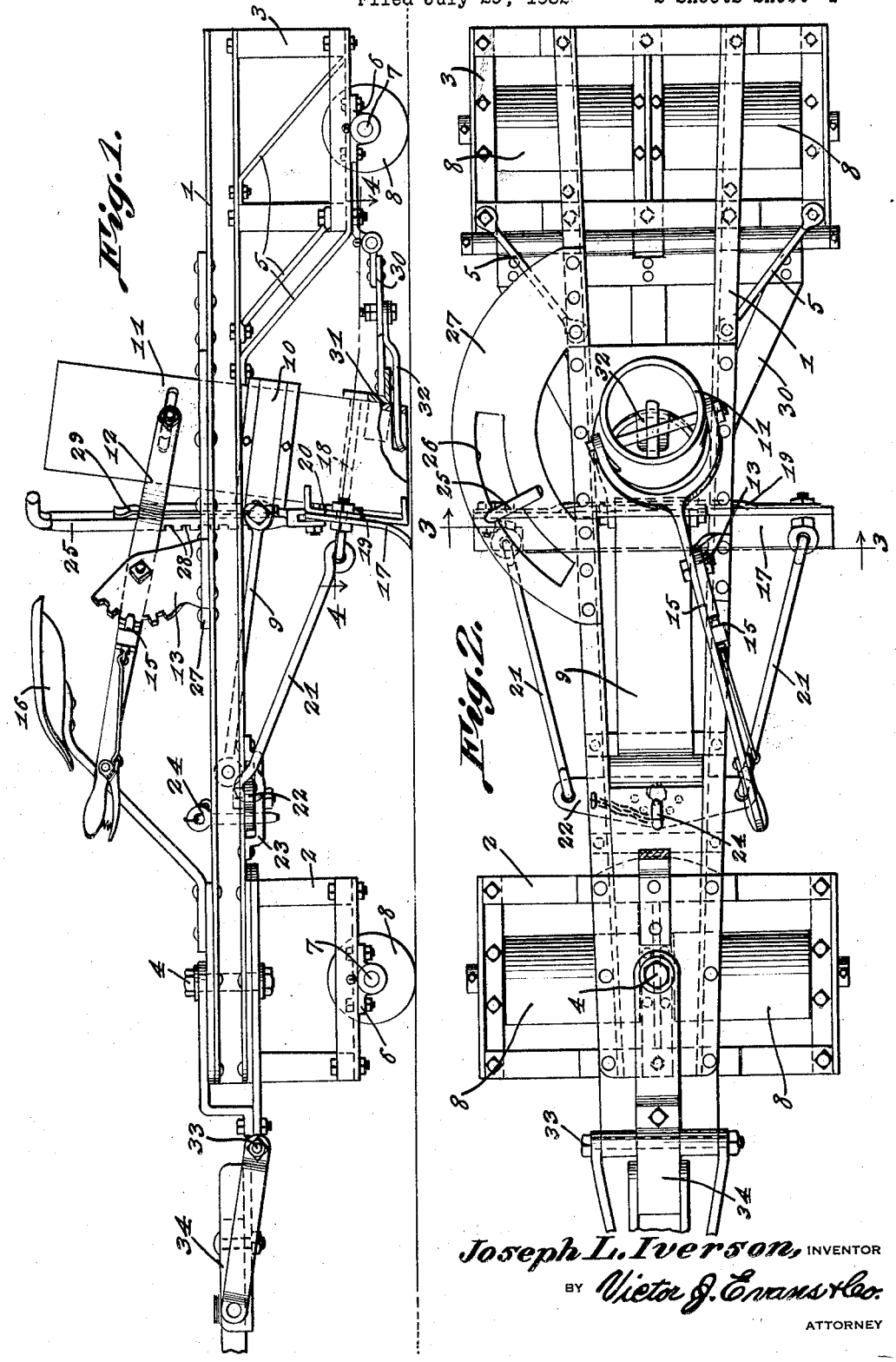
Joseph L. Iverson, INVENTOR
BY Victor J. Evans & Co.
ATTORNEY Jan. 17, 1933.  J. L. IVERSON  1,894,871
LAND LEVELER
Filed July 29, 1932  2 Sheets-Sheet 2
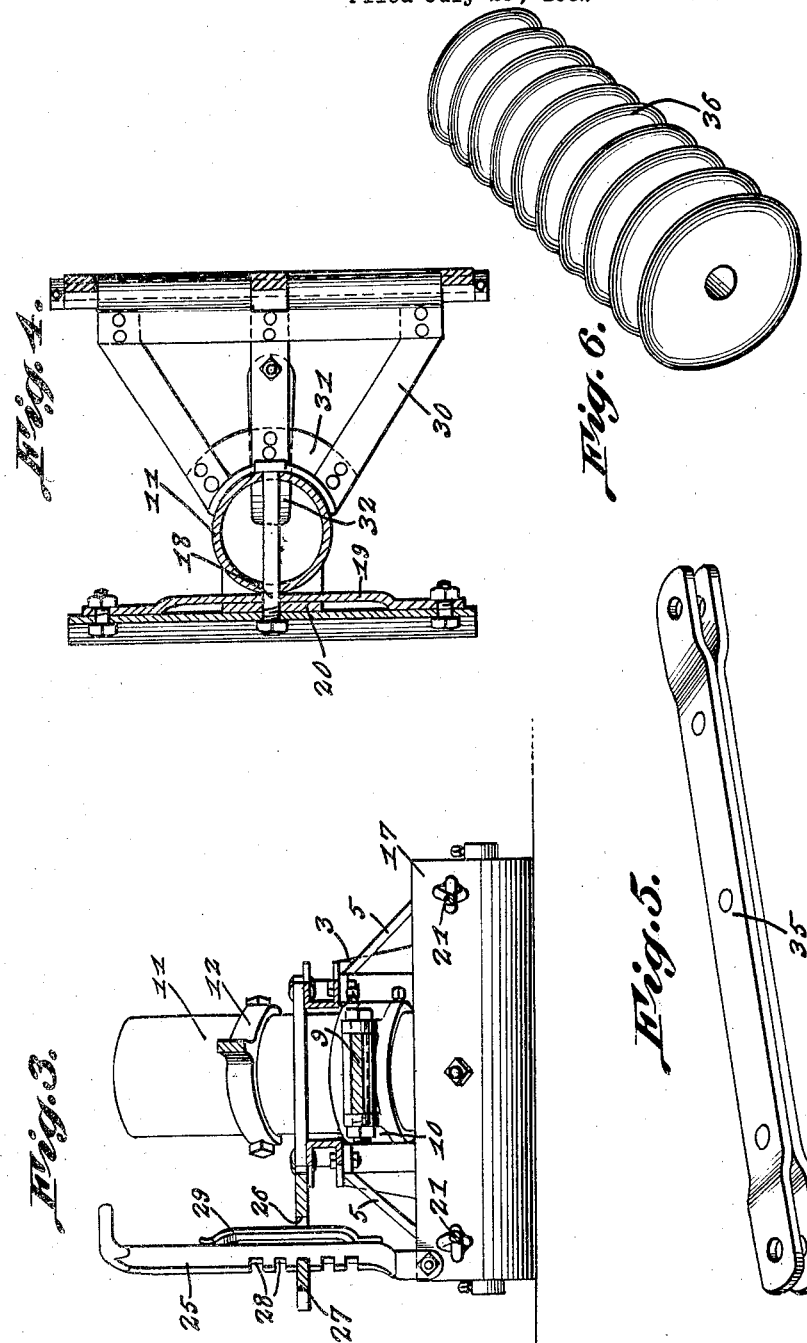
Joseph L. Iverson, INVENTOR
BY Victor J. Evans & Co.
ATTORNEY Patented Jan. 17, 1933

1,894,871

UNITED STATES PATENT OFFICE

JOSEPH L. IVERSON, OF HELENA, MONTANA

LAND LEVELER

Application filed July 29, 1932. Serial No. 626,115.

This invention relates to land levelers and has for the primary object, the provision of a device of the above stated character whereby plowed or lumpy ground may be crushed or pulverized and then leveled and packed or rolled, thereby placing the ground in condition for planting or other agricultural purposes.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a land leveler constructed in accordance with my invention.

Figure 2 is a top plan view illustrating the same.

Figure 3 is a transverse sectional view taken on the line 3—3 of Figure 2.

Figure 4 is a detail sectional view taken on the line 4—4 of Figure 1.

Figure 5 is a perspective view illustrating a tractor hitch.

Figure 6 is a perspective view illustrating a modified form of crushing roller.

Referring in detail to the drawings, the numeral 1 indicates a main frame having associated therewith transversely arranged auxiliary frames 2 and 3. The auxiliary frame 2 is located at the forward end of the main frame 1 and is pivotally connected thereto by a king bolt 4. The auxiliary frame 3 is located at the rear end of the main frame 1 and is secured thereto and also strengthened by a plurality of braces 5. The auxiliary frames 2 and 3 are provided with bearings 6 to receive axles 7 on which are journalled rollers 8. The rollers 8 besides supporting the device for movement over the ground act as mediums for crushing lumpy ground and packing or rolling the latter.

An arm 9 is pivoted at one end to the main frame rearwardly of the auxiliary frame 2 and its free end has pivoted thereto a yoke 10 surrounding an adjusting post 11.

The post 11 is arranged vertically and extends above and below the main frame 1 and has an adjusting lever 12 pivotally and slidably connected thereto above the main frame 1. The lever 12 is pivotally supported by a bracket 13 upon the main frame and is provided with a means 15 for locking the lever in any of its adjusted positions. The forward end of the lever is arranged adjacent the operator's seat 16 so that the operator may raise and lower the post 11 as desired.

A shovel 17 is arranged transversely of the main frame 1 and between the front and rear rollers 8 and is pivotally connected to the lower portion of the post 11 as shown at 18. The shovel is provided with a bracket 19 apertured to receive the pivot 18 and also slidably receive the guide plate 20 carried by the post. Links 21 are pivotally connected to the shovel adjacent its ends and extend forwardly and upwardly and are pivotally connected to the ends of a plate 22, the latter being pivotally connected to the main frame by a bracket 23. The plate 22 is provided with a series of openings any one of which is adapted to receive a locking pin 24 for holding the plate at various angles relative to the main frame. By adjusting the position or angle of the plate varies the angle of the shovel 17, that is, either end of the shovel may be made to travel in advance of the other end. The shovel 17 also being raised and lowered relative to the ground by the post 11 and the lever 12.

A lever 25 is pivoted to one end of the shovel 17 and extends upwardly through an arcuate shaped slot 26 in an anchoring plate 27 carried by the main frame. The lever 25 is provided with a series of notches 28 adapted to engage one wall of the slot 26 by the influence of a leaf spring 29. The lever 25 is for the purpose of raising and lowering one end of the shovel as desired and locking said end of the shovel in any of its adjusted positions.

A bracing structure 30 is hinged to the auxiliary frame 3 and carries at its forward end an arcuate shaped shoe 31 engaging the lower portion of the post 11 and directly in rear of the point of connection between the post and the shovel. The bracing structure 30 prevents rearward movement of the lower portion of the post 11 during the operation of the machine and under the stress or strain of the shovel acting upon the ground, but which will permit the post 11 to be adjusted upwardly and downwardly when desired. A plate 32 is pivoted to the bracing structure 30 and extends through a slot in the lower portion of the post 11.

A draft coupler 33 is pivoted to the forward end of the main frame and has detachably secured thereto either a tongue 34 to which draft animals may be hitched or a tractor coupling bar 35 as shown in Figure 5.

The front rollers 8 instead of having smooth peripheries may be corrugated as shown at 36 in Figure 6 which will aid in crushing clogs or lumpy ground.

From the foregoing description taken in connection with the accompanying drawings it will be seen that a land leveler has been provided which may be drawn by either a tractor or draft animals and when moving over ground will crush or pulverize lumps therein and then level the ground and thereafter roll the ground, placing the ground in proper condition for planting or other agricultural purposes.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. A land leveler comprising a main frame, front and rear rollers supporting said frame for the purpose of acting upon the ground to pulverize and roll the latter, a post adjustably mounted on the main frame and extending above and below the latter, a transverse shovel pivotally connected to the post for acting upon the ground, a plate pivoted to the main frame, links pivoted to the shovel and to the plate, and means for locking the plate in various adjusted positions for varying the angle of the shovel.

2. A land leveler comprising a main frame, front and rear rollers supporting said frame for the purpose of acting upon the ground to pulverize and roll the latter, a post adjustably mounted on the main frame and extending above and below the latter, a transverse shovel pivotally connected to the post for acting upon the ground, a plate pivoted to the main frame, links pivoted to the shovel and to the plate, means for locking the plate in various adjusted positions for varying the angle of the shovel, and an adjustable means between the main frame and one end of the shovel for varying the inclination of the latter.

3. A land leveler comprising a main frame, front and rear rollers supporting said frame for the purpose of acting upon the ground to pulverize and roll the latter, a post adjustably mounted on the main frame and extending above and below the latter, a transverse shovel pivotally connected to the post for acting upon the ground, a plate pivoted to the main frame, links pivoted to the shovel and to the plate, means for locking the plate in various adjusted positions for varying the angle of the shovel, an adjustable means between the main frame and one end of the shovel for varying the inclination of the latter, and a bracing structure hinged to the frame and engaging the lower portion of the post.

In testimony whereof I affix my signature.

JOSEPH L. IVERSON.